(12) United States Patent
Ford

(10) Patent No.: US 6,805,498 B2
(45) Date of Patent: Oct. 19, 2004

(54) UNIVERSAL SURVEILLANCE CAMERA HOLDER AND ADAPTOR

(75) Inventor: Jay Ford, Madera, CA (US)

(73) Assignee: Pelco, Clovis, CA (US)

( * ) Notice: Subject to any disclaimer, the term of this patent is extended or adjusted under 35 U.S.C. 154(b) by 0 days.

(21) Appl. No.: 10/733,932

(22) Filed: Dec. 10, 2003

(65) Prior Publication Data

US 2004/0120702 A1 Jun. 24, 2004

Related U.S. Application Data

(63) Continuation of application No. 10/205,722, filed on Jul. 25, 2002, now Pat. No. 6,715,939, which is a continuation of application No. 29/145,776, filed on Jul. 27, 2001.
(60) Provisional application No. 60/308,649, filed on Jul. 27, 2001.

(51) Int. Cl.[7] ............................................. G03B 17/00
(52) U.S. Cl. ..................... 396/427; 396/428; 348/151; 348/373; 348/375; 348/376; D3/218; D3/219; D3/242; D3/267
(58) Field of Search ................................. 396/427, 428, 396/535, 544; 348/151, 373, 375, 376; 352/34, 242, 243; D3/218, 219, 242, 267

(56) References Cited

U.S. PATENT DOCUMENTS

| | | | |
|---|---|---|---|
| D181,590 S | 12/1957 | Lang | |
| 3,638,502 A | 2/1972 | Leavitt et al. | |
| 3,720,147 A | 3/1973 | Bemis | |
| 3,732,368 A | 5/1973 | Mahlab | |
| 3,739,709 A | 6/1973 | Behles | |
| 4,080,629 A | 3/1978 | Hammond et al. | |
| 4,160,999 A | 7/1979 | Claggett | |
| 4,217,606 A | 8/1980 | Nordmann | |
| 4,320,949 A | 3/1982 | Pagano | |

(List continued on next page.)

Primary Examiner—D. Rutledge
(74) Attorney, Agent, or Firm—Mark D. Miller

(57) ABSTRACT

A universal adaptor that may be used to hold any of a number of different surveillance cameras for deployment in any of a number of different camera housings or enclosures. The adaptor is in the form of a bi-sectional open-ended generally rectangular assembly designed to snap together around a camera and its associated PC boards encapsulating them into a single unit. The assembly includes a plurality of internal slots for holding up to several PC boards associated with the camera, and optional frontal tabs for heating/defrost elements. The camera lens extends through a wide opening at one end of the adaptor. Ventilation, access and attachment openings are provided on the adaptor allowing access to the interior for adjusting PC board switches, running wires and attaching the unit inside a larger mounting enclosure.

10 Claims, 8 Drawing Sheets

U.S. PATENT DOCUMENTS

| | | |
|---|---|---|
| 4,414,576 A | 11/1983 | Randmae |
| 4,736,218 A | 4/1988 | Kutman |
| 4,764,008 A | 8/1988 | Wren |
| 4,833,534 A | 5/1989 | Paff et al. |
| 4,901,146 A | 2/1990 | Struhs et al. |
| 4,920,367 A | 4/1990 | Pagano |
| D307,915 S | 5/1990 | Kuester, III |
| 4,945,367 A | 7/1990 | Blackshear |
| 4,984,089 A | 1/1991 | Stieple et al. |
| 5,028,997 A | 7/1991 | Elberbaum |
| D325,212 S | 4/1992 | Elberbaum |
| 5,111,288 A | 5/1992 | Blackshear |
| 5,115,263 A | 5/1992 | Bernhardt et al. |
| 5,121,215 A | 6/1992 | Boers et al. |
| 5,159,368 A | 10/1992 | Zemlin |
| 5,181,120 A | 1/1993 | Hickey et al. |
| 5,214,245 A | 5/1993 | Bernhardt et al. |
| 5,221,964 A | 6/1993 | Chamberlain et al. |
| 5,223,872 A | 6/1993 | Stiepel et al. |
| D340,940 S | 11/1993 | Ellenberger et al. |
| D349,714 S | 8/1994 | Hasegawa |
| 5,394,184 A | 2/1995 | Anderson et al. |
| 5,394,208 A | 2/1995 | Campbell |
| 5,418,567 A | 5/1995 | Boers et al. |
| D365,588 S | 12/1995 | Fernandez |
| D371,236 S | 7/1996 | Scheid et al. |
| 5,563,659 A | 10/1996 | Bernhardt et al. |
| 5,627,616 A | 5/1997 | Sergeant et al. |
| 5,689,304 A | 11/1997 | Jones et al. |
| D388,450 S | 12/1997 | Hamano et al. |
| 5,768,647 A | 6/1998 | Coffin et al. |
| 5,768,648 A | 6/1998 | Skipp et al. |
| 5,852,754 A | 12/1998 | Schneider |
| 5,864,365 A | 1/1999 | Sramek et al. |
| 5,905,923 A | 5/1999 | Chitsaz et al. |
| 5,931,432 A | 8/1999 | Herold et al. |
| D413,435 S | 9/1999 | Chapman et al. |
| 5,966,176 A | 10/1999 | Chow et al. |
| 5,966,551 A | 10/1999 | Haraguchi et al. |
| 6,019,524 A | 2/2000 | Arbuckle |
| 6,234,691 B1 | 5/2001 | Jones et al. |
| 6,268,882 B1 | 7/2001 | Elberbaum |
| 6,354,749 B1 | 3/2002 | Pfaffenberger, III |

UNIVERSAL SURVEILLANCE CAMERA HOLDER AND ADAPTOR

This is a continuation of application claims the benefit of U.S. Application No. 10/205,722 filed Jul. 25, 2002 now U.S. Pat. No. 6,715,939 which claims the benefit of U.S. Provisional Application No. 60/308,649 filed Jul. 27, 2001, and which is a continuation U.S. Design Patent Application No. 29/145,776 filed on Jul. 27, 2001.

BACKGROUND OF THE INVENTION

1. Field of the Invention

The present invention relates to mounting structures for surveillance cameras, and more particularly to a universal surveillance camera holder and adaptor that is designed for use with numerous different cameras sizes, types, styles and configurations and that may be deployed in numerous different camera housings and enclosures.

2. Description of the Prior Art

The field of surveillance cameras includes a wide variety of different camera sizes, types, styles, configurations and combinations. There are cameras ranging from simple black-and-white cameras to highly complex color cameras. Surveillance cameras may have optical lenses ranging from very small to very large, depending upon the application, and most cameras include one or more printed circuit (PC) boards to control such camera functions as zoom, focus and adjustments for lighting. An example is the camera disclosed in U.S. Pat. No. 5,221,964. A separate PC board is often provided for the camera power supply. It is also common for such PC boards to have switches located thereon for establishing default or other preset or adjustable configurations for the camera, requiring that it be possible to easily access such switches. Many surveillance cameras are also equipped with heaters to prevent condensation from forming on the camera lenses, presenting unique mounting requirements. Accordingly, there are numerous permutations and combinations of unique surveillance camera mounting requirements presented in the field of surveillance cameras.

There are also a wide variety of mounting structures and housings used to hold surveillance cameras when deployed in the field. Typical housing structures include ceiling domes or bubbles, angled ceiling mounts, flush ceiling mounts and the like. Other common mounting structures include pole or surface mounted housings that may be generally cylindrical, rectangular, round, oval, free form, or combinations thereof. U.S. Pat. Nos. 4,414,576 and 5,966,176 disclose hingedly closable surveillance camera housings. U.S. Pat. No. 5,563,659 discloses a slidbaly detachable outer shell for a surveillance camera. Accordingly, each surveillance camera mounting structure presents unique mounting requirements in order for a camera to be deployed therein.

It is therefore desirable to provide a universal surveillance camera holder that is capable of acting as an adaptor for holding any of a wide variety of different camera sizes, shapes and configurations such that the holder-and-camera combination may be easily deployed in any of a wide variety of different camera housing structures.

SUMMARY OF THE INVENTION

The present invention provides a universal adaptor that may be used to hold any of a number of different surveillance cameras for deployment in any of a number of different camera housings or enclosures. The adaptor of the present invention is in the form of a bi-sectional open-ended generally rectangular camera holding assembly. The assembly is designed to snap together around a camera and its associated PC boards encapsulating them into a single unit. The assembly is provided with a plurality of internal slots for holding up to several PC boards associated with the camera. A wide opening is provided at one end of the adaptor through which the camera lens extends. This wide opening allows for the adaptor to accommodate a wide range of camera lens sizes and diameters. Ventilation openings are provided at the opposite end of the adaptor, and additional openings are provided in the adaptor walls. These openings allow access to the interior for adjustment of internal PC board switches and the like, and also provide channels through which connecting wires may be passed. Mounting means are provided on the four side walls of the adaptor making it easy to attach the adaptor (with camera and electronics mounted inside) to numerous different camera housing structures. Additional mounting tabs are provided at the open end of the enclosure to support heating elements or other items associated with the camera lens.

It is therefore a primary object of the present invention to provide a universal adaptor for holding any of a number of different surveillance cameras and their associated lenses and PC boards for deployment in any of a number of different camera housings or mounting enclosures.

It is also an important object of the present invention to provide an adaptor for use in holding a surveillance camera having any of a wide variety of different lens sizes or shapes for deployment in a camera housing or enclosure.

It is also an important object of the present invention to provide an adaptor for use in holding a surveillance camera having a number of associated PC boards for deployment in a camera housing or enclosure.

It is also an important object of the present invention to provide an adaptor for use in holding a surveillance camera for deployment in a camera housing or enclosure that allows access to interior PC boards switches.

It is also an important object of the present invention to provide an adaptor for use in holding a surveillance camera deployed in a camera housing or enclosure that allows wires to pass through the adaptor between the camera and the enclosure.

It is also an important object of the present invention to provide an adaptor for use in holding a surveillance camera with one or more defrost/heating elements in the vicinity of the camera lens deployed in a camera housing or enclosure.

It is also an important object of the present invention to provide an adaptor for use in holding a surveillance camera for deployment in any of a number of different camera housings or enclosures.

Additional objects of the invention will be apparent from the detailed descriptions and the claims herein.

DETAILED DESCRIPTION OF A PREFERRED EMBODIMENT

Figure 1:
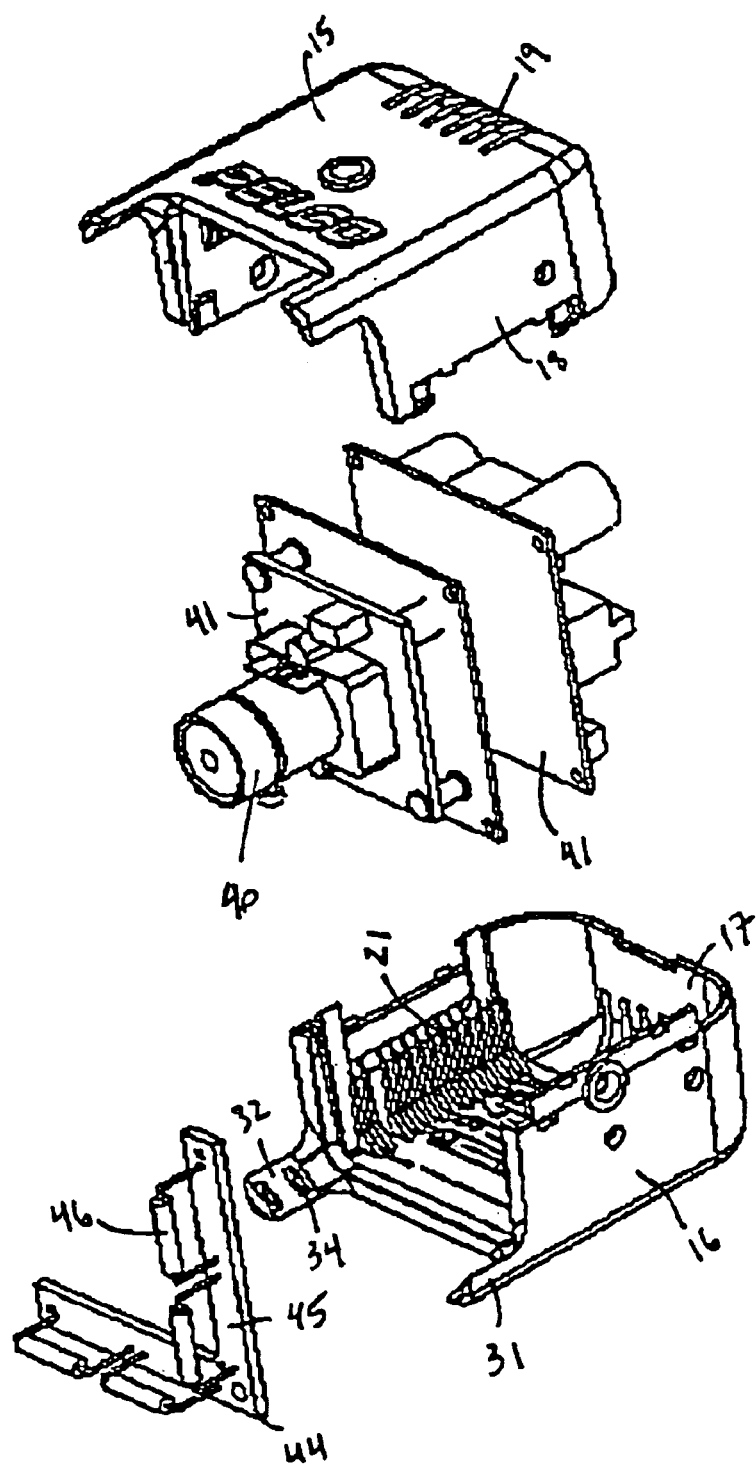
FIG. 1 is an exploded view showing the two halves of the enclosure assembly of the present invention, a camera having associated PC boards and a heating unit.

Referring to the drawings wherein like reference characters designate like or corresponding parts throughout the several views, and referring particularly to FIGS. 4–8, it is seen that the enclosure assembly of the present invention includes first and second halves or shells 11 and 12 that attach together to form a single assembly or adaptor 13. The illustrations of shells 11 and 12 in the drawings herein are identical, but it is to be appreciated that while the description refers to such identical shells, the present invention includes shells that are not identical, nor even mirror images of each other.

Figure 6:
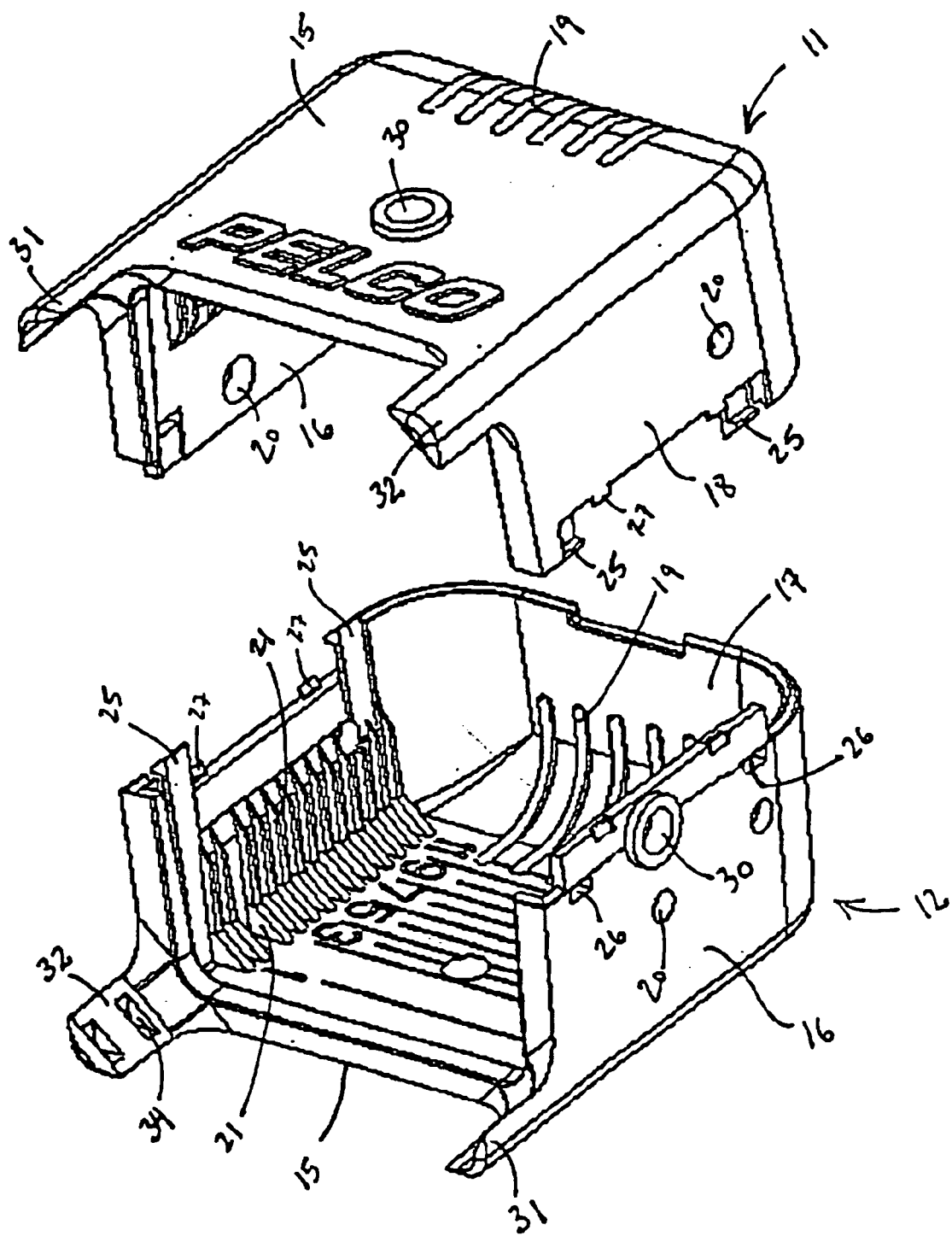
FIG. 6 is an exploded view of the two halves of the present invention.
Figure 7:
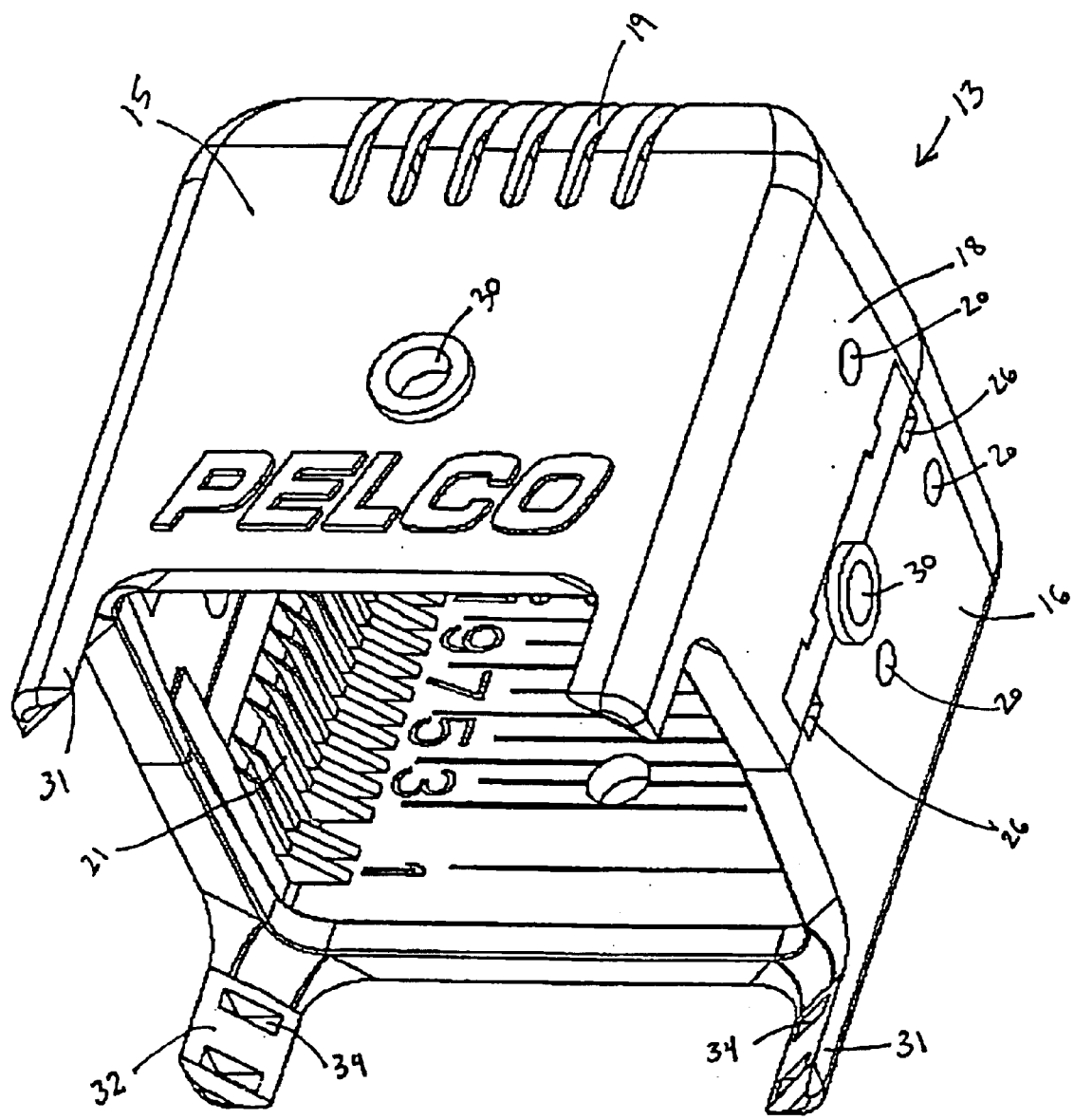
FIG. 7 is a side perspective view of the two assembled halves of the present invention.
Figure 8:
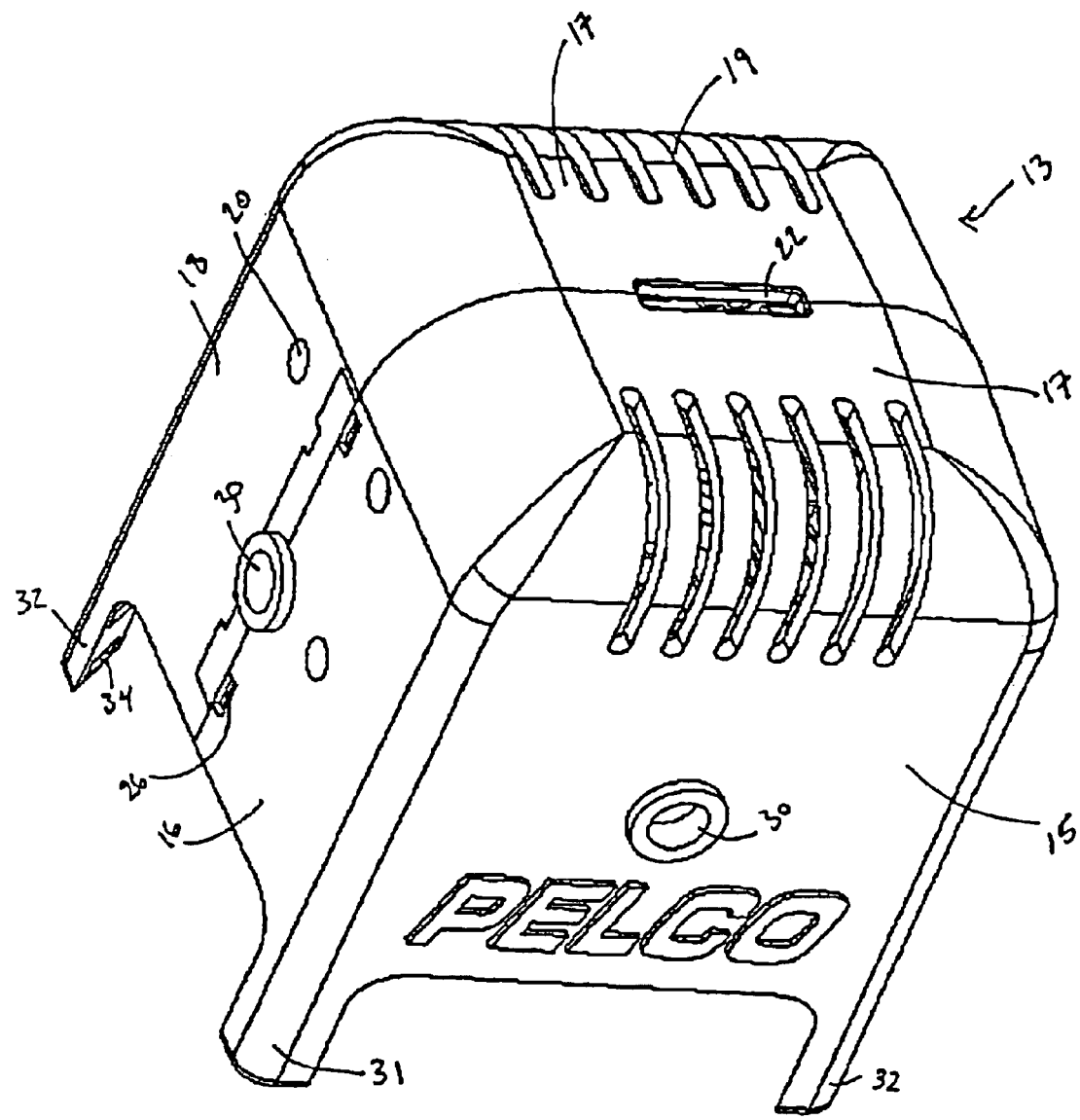
FIG. 8 is an opposite side perspective view of the two assembled halves of the present invention.

As best seen in FIG. 6, each of shells 11 & 12 includes a base panel 15, two side panels 16 & 18 adjacent to base panel 15, and an end panel 17. When attached together (FIG. 7), shells 11 and 12 form a single adaptor 13 unit having a wide opening 14 at one end through which the camera lens 40 extends. A plurality of ventilation openings 19 are provided on each base panel 15 where it meets end panel 17. A plurality of ridges 21 are provided on the inside of each base panel 15 and extending up along side panels 16 and 18 establishing slots for receiving PC boards associated with the camera to be placed in the adaptor. The ridges 21 of shell 11 are aligned with the corresponding ridges 21 of shell 12 to form elongated support slots for the PC boards in the assembled unit 13.

Each of shells 11 & 12 may also include two legs 31, 32 which extend out from the front corners where the base panel 15 meets each of the side panels 16 & 18, opposite from end panel 17. Each of legs 31 & 32 includes one or more slots 34 for receiving the corner of a PC board or other structure to be mounted near or in front of the camera lens 40 (such as a support for a heating/defrost element, an infrared or ultraviolet panel, a color cover for the camera lens, or any other structure associated with the camera lens).

Each of shells 11 & 12 also includes a means for attachment to the corresponding shell. In the embodiment illustrated in FIG. 6, it is seen that panel 18 of shell 11 is provided with a plurality of engagement tabs 25 (in the illustration, two such tabs 25 are shown although any suitable number may be used), and corresponding panel 16 of shell 12 is provided with a corresponding plurality of slots 26 for engagement with tabs 25. Guide tabs 27 are also provided on panel 18 for alignment with slots 28 on corresponding panel 16 of shell 12. A lip at the end of each tab 25 locks each tab 25 into its corresponding slot 26 making disassembly of the attached shells 11, 12 extremely difficult. It is to be appreciated that shells 11 and 12 need not be identical or even mirror images of each other in order for tabs 25, slots 26 and guides 27 to operate effectively.

A plurality of mounting structures such as attachment nuts or openings 30 are provided on base panel 15 and side panel 16 of each shell, such that at least four such structures 30 are available on the assembled enclosure 13, one on each of the four sides. The numerous structures 30 on each of the four sides of the assembled adaptor 13 make it easier to select and use one or more of these structure 30 for attachment of adaptor 13 to the camera housing or enclosure into which it is to be deployed. A plurality of other openings 20 are also provided on side panels 16 & 18 through which switches or other controls 49 on the internal PC boards may be accessed, or through which wires may be passed. A rear opening 22 is also provided to allow access to the rear PC board and/or to allow wires to pass.

Figure 2:
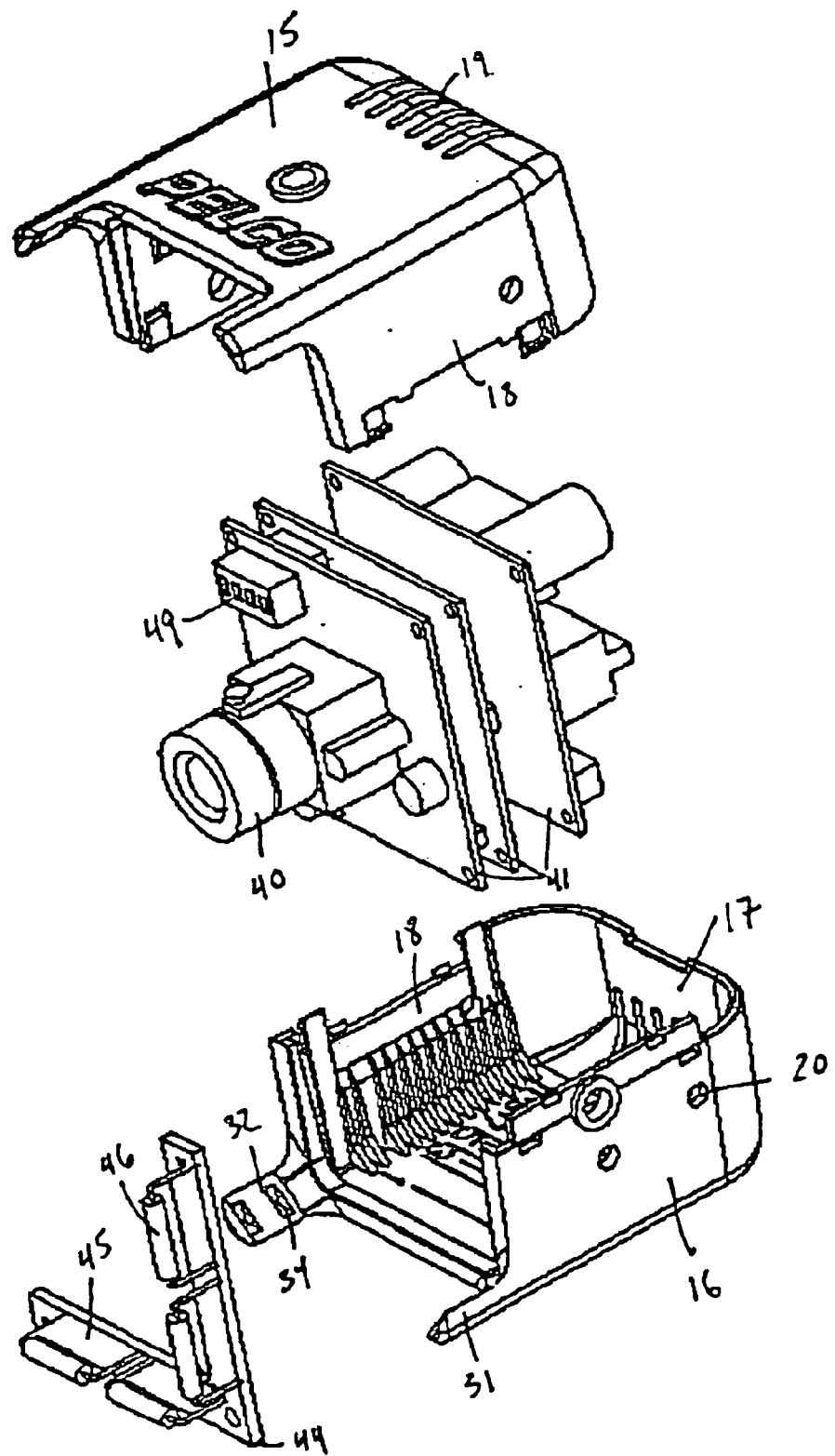
FIG. 2 is another exploded view showing the two halves of the enclosure assembly of the present invention with a larger camera having associated PC boards and a heating unit.
Figure 3:
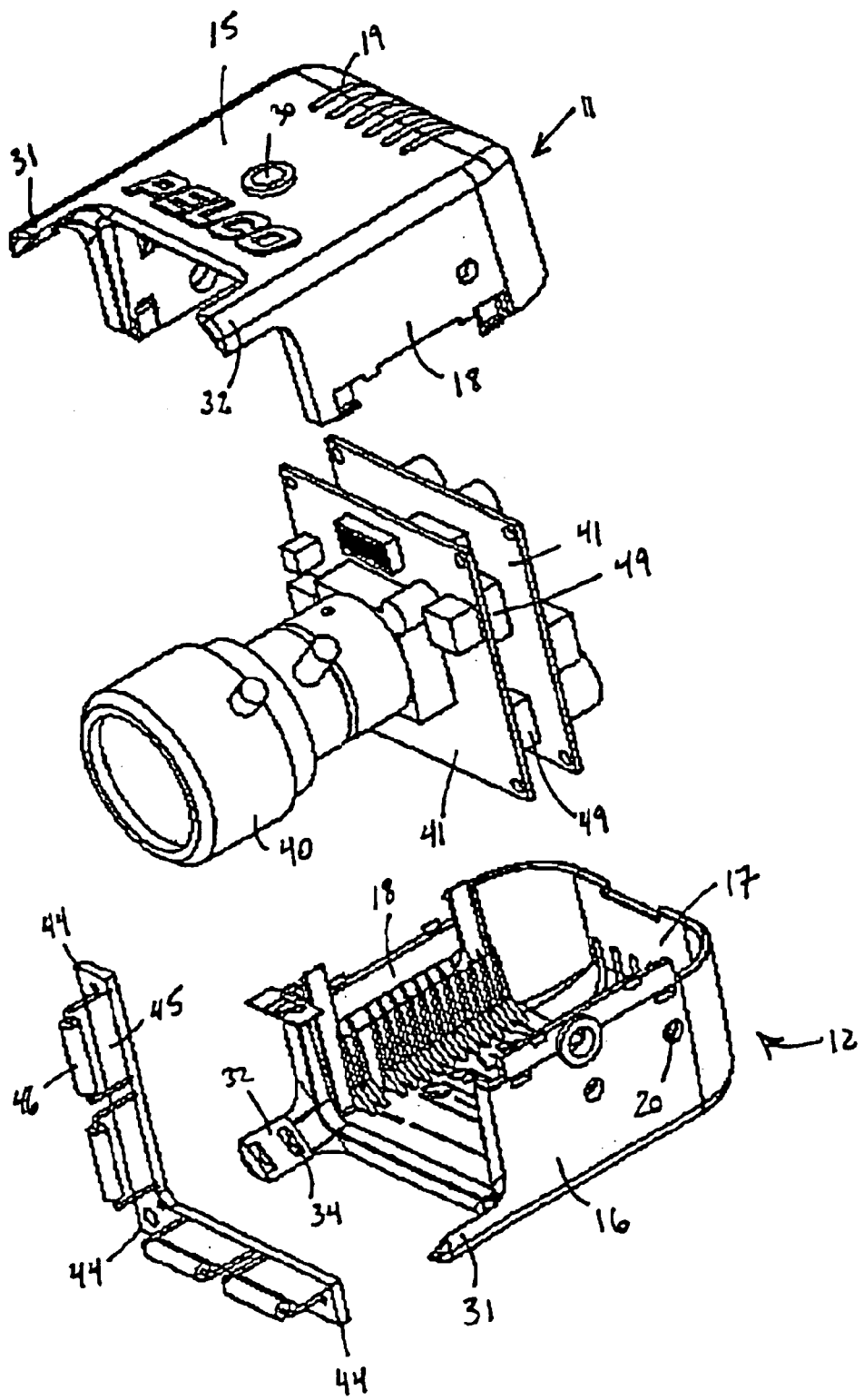
FIG. 3 is another exploded view showing the two halves of the enclosure assembly of the present invention, with an even larger camera having associated PC boards and a heating unit.
Figure 4:
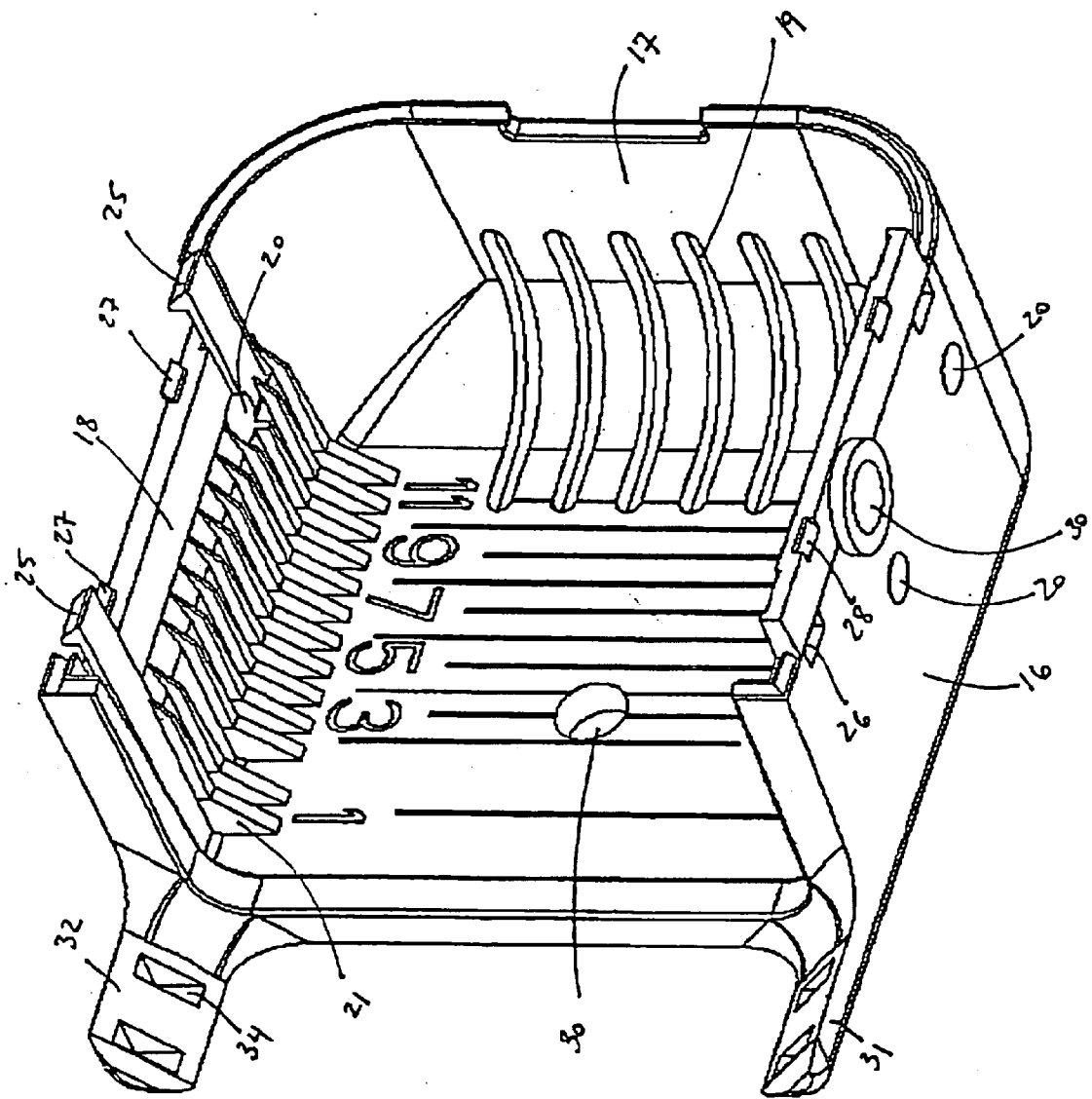
FIG. 4 is a perspective view of the inside of one of the two halves of the present invention.
Figure 5:
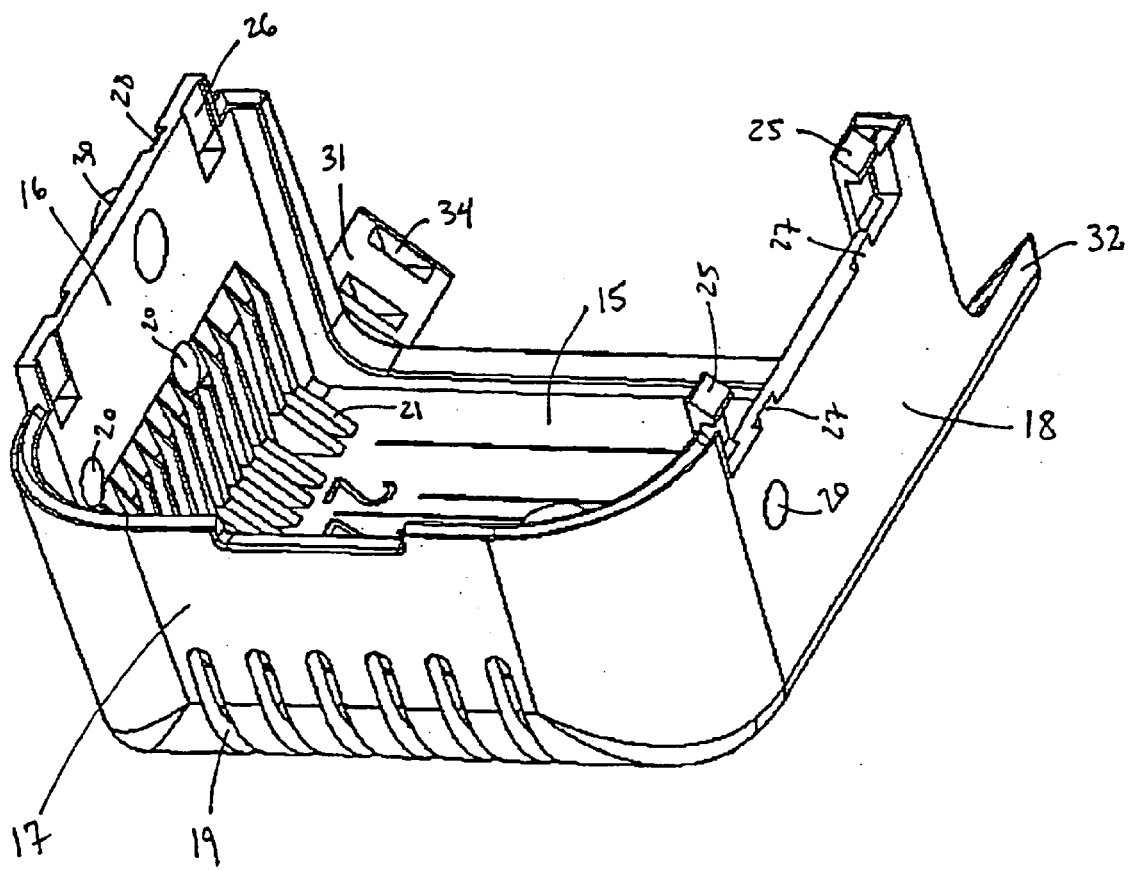
FIG. 5 is a perspective view of the outside of one of the two halves of the present invention.

Turning to FIGS. 1–3, it is seen that a camera 40 is mounted on a PC board 41, and the edges of PC boards 41 are fitted into the slots between ridges 21 inside shells 11, 12. Then shells 11 and 12 are attached together such that ridges 21 hold PC boards 41 firmly in place. Prior to or after attachment of shells 11 and 12, an L-shaped PC board 45 may be attached to legs 31, 32 by inserting the corners 44 of board 45 into slots 34 of legs 31 and 32. PC board 45 in FIGS. 1–3 supports a plurality of heating elements 46 which must be deployed in the near vicinity of the lenses of camera 40 to prevent condensation. Controls 49 on PC boards 41 may be accessed through rear openings 20 or through the wide camera opening 14.

It is to be understood that variations and modifications of the present invention may be made without departing from the scope thereof. It is also to be understood that the present invention is not to be limited by the specific embodiments disclosed here but only in accordance with the appended claims when read in light of the foregoing specification.

What is claimed is:

1. An adaptor for holding a surveillance camera inside a housing enclosure comprising first and second interlocking shells for engagement around said camera, each such shell including a base, first and second sidewalls attached to said base, and an endwall attached to said base and extending between said sidewalls; said first shell having at least one locking tab on the outer edge of a sidewall thereof, and said second shell having at least one slot on the outer edge of a sidewall thereof such that the at least one tab of said first shell engages the at least one slot of said second shell forming a single unit for holding said camera.

2. The adaptor of claim 1 wherein a plurality of interior ridges are provided on the base and sidewalls of each of said shells forming a plurality of slots for holding PC boards associated with said camera.

3. The adaptor of claim 1 wherein a first outwardly extending tab is provided on the base of one of said shells at the corner where said base meets the first sidewall opposite from the endwall, and a second outwardly extending tab is provided on said base at the corner where said base meets the second sidewall opposite from the endwall.

4. The adaptor of claim 1 wherein at least one mounting slot is provided in each of said outwardly extending tabs.

5. The adaptor of claim 1 wherein at least one mounting opening is provided on the base of at least one of said shells and on the first sidewall of each of said shells.

6. The adaptor of claim 1 wherein an opening is provided on at least one of said endwalls for communication between the interior and exterior of said unit.

7. The adaptor of claim 1 wherein at least one opening is provided on the base of at least one of said shells for communication between the interior and exterior of said unit.

8. The adaptor of claim 1 wherein at least one opening is provided on the first sidewall of at least one of said shells for communication between the interior and exterior of said unit.

9. The adaptor of claim 1 wherein at least one opening is provided on the second sidewall of at least one of said shells for communication between the interior and exterior of said unit.

10. The adaptor of claim 3 wherein a third outwardly extending tab is provided on the base of the other of said shells at the corner where said base meets the first sidewall opposite from the endwall, and a fourth outwardly extending tab is provided on said base at the corner where said base meets the second sidewall opposite from the endwall.

* * * * *